J. F. GOODRICH.
APPARATUS AND PROCESS FOR RAISING VEHICLES.
APPLICATION FILED JAN. 20, 1921.
1,412,932.
Patented Apr. 18, 1922.
3 SHEETS—SHEET 3.
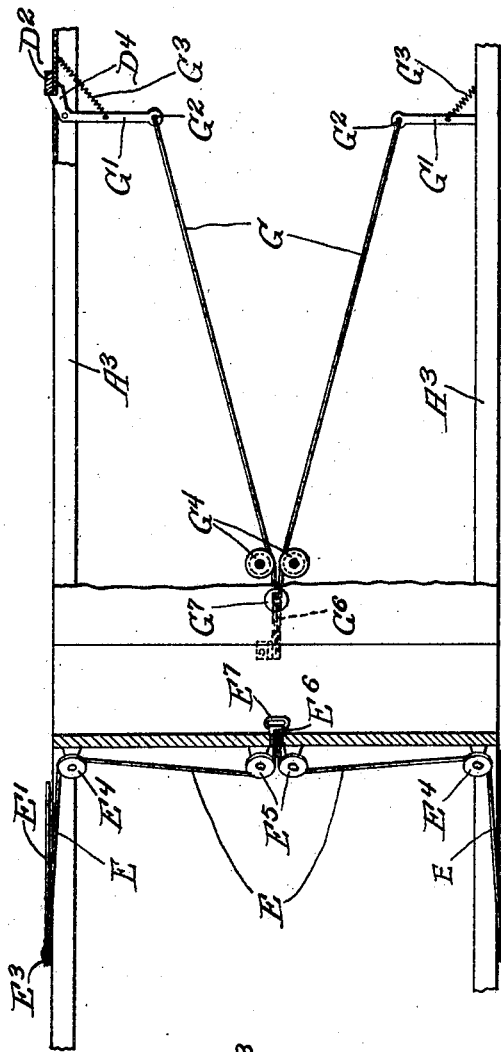
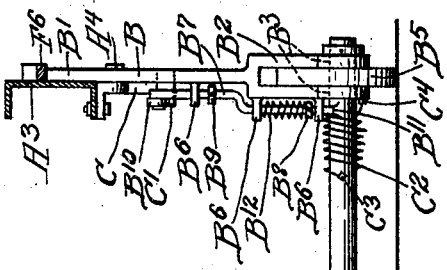
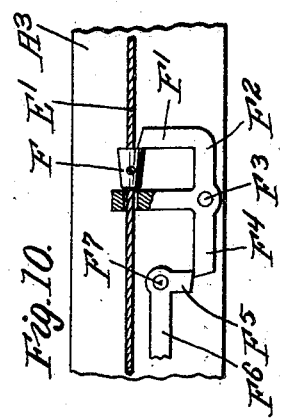
Witness
Edward T. Wray.
Inventor
John F. Goodrich
by Parker & Carter
Attorneys

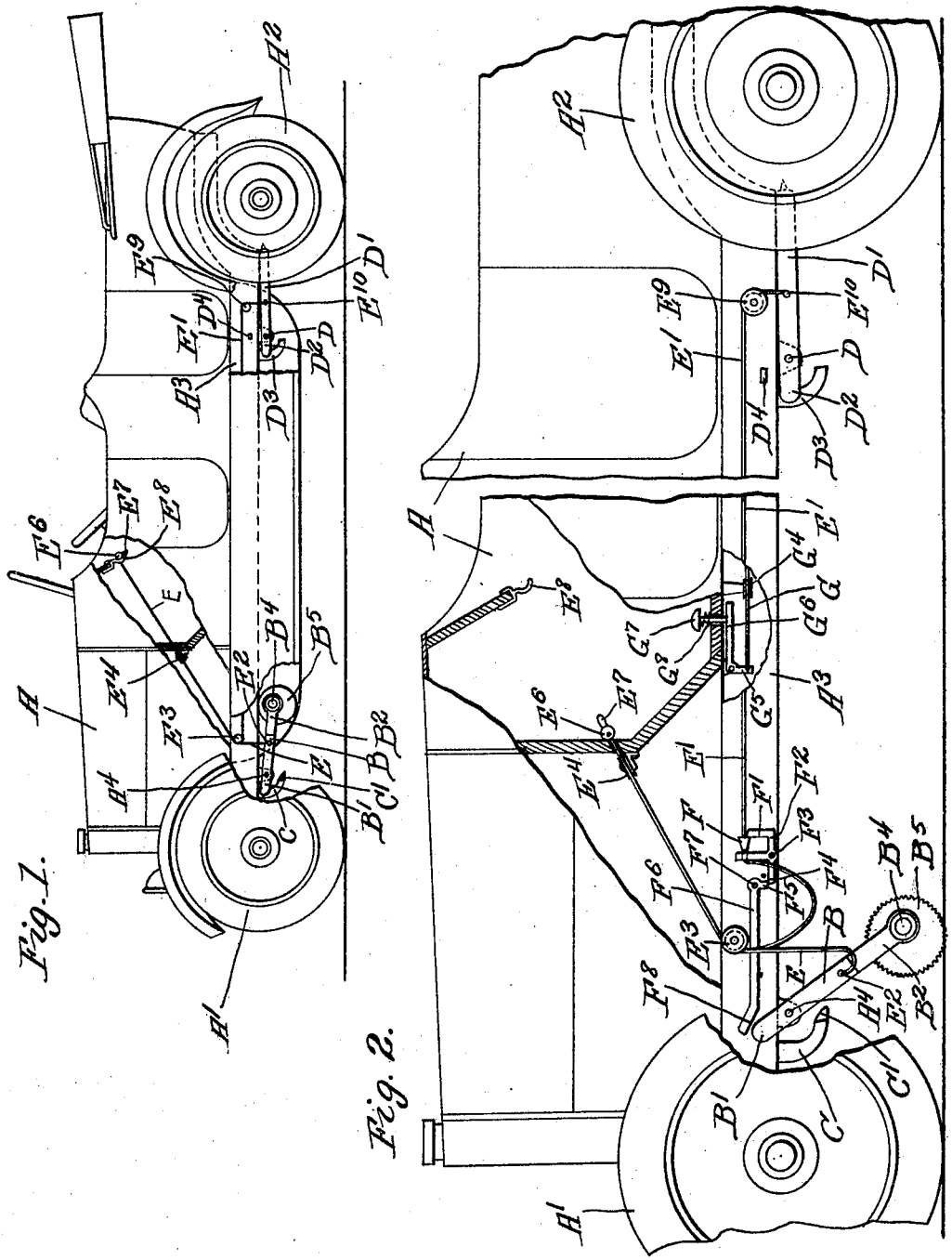

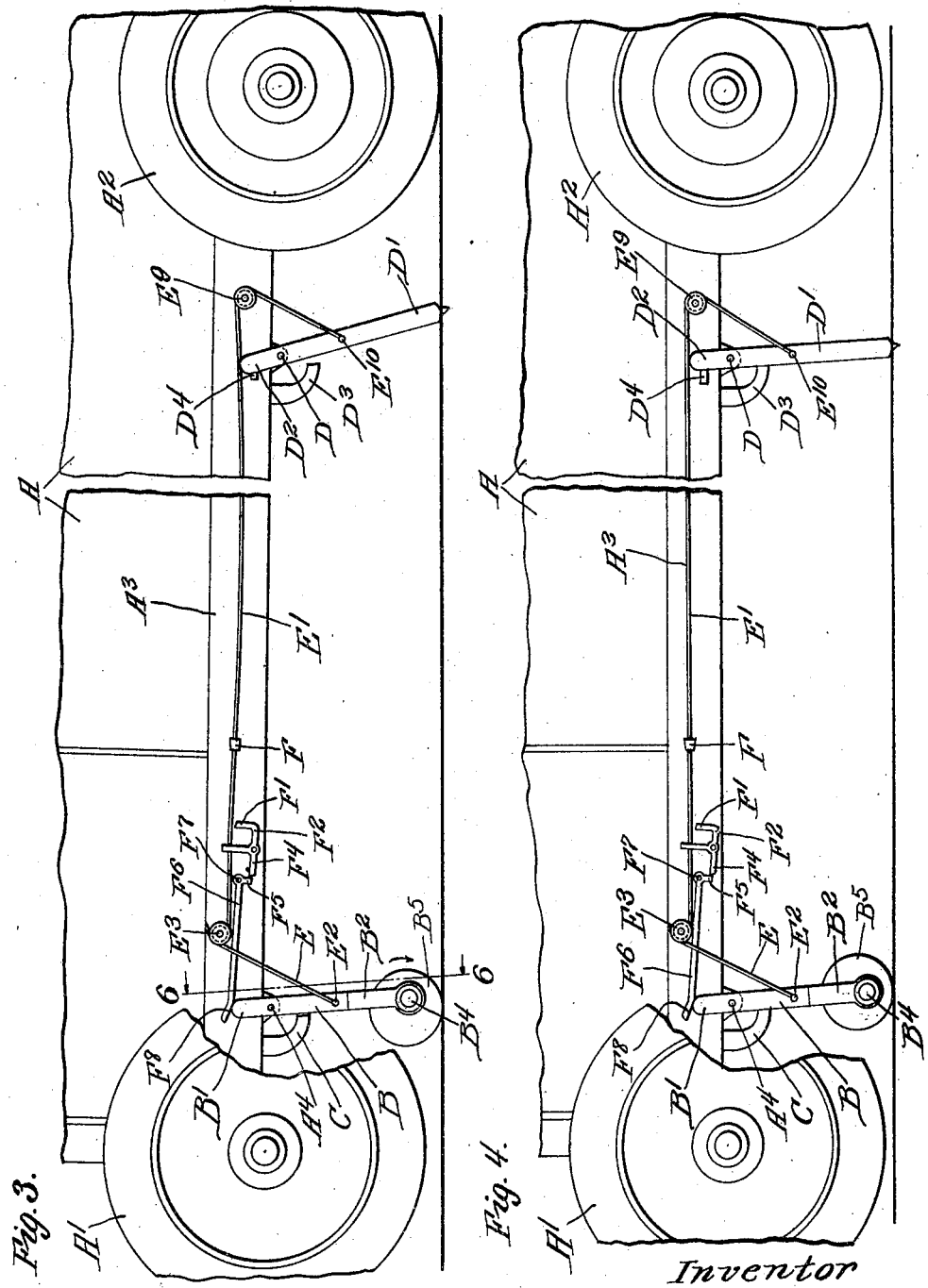

UNITED STATES PATENT OFFICE.

JOHN F. GOODRICH, OF CHICAGO, ILLINOIS.

APPARATUS AND PROCESS FOR RAISING VEHICLES.

1,412,932.     Specification of Letters Patent.     Patented Apr. 18, 1922.

Application filed January 20, 1921. Serial No. 438,594.

*To all whom it may concern:*

Be it known that I, JOHN F. GOODRICH, a citizen of the United States, residing at Chicago, in the county of Cook and State of Illinois, have invented a certain new and useful Improvement in an Apparatus and Processes for Raising Vehicles, of which the following is a specification.

This invention relates to a vehicle raising device and more particularly to a device for lifting automotive vehicles in which the motive power of the vehicle is used to lift the wheels of the vehicles from the ground, through the intermediary of lifting elements carried beneath the vehicle.

It has for one object to provide means, operable by the driver from his seat, for lifting the wheels of a pneumatic tired vehicle from the ground, to prevent pressure on the tires when the heavy or loaded vehicle is at rest.

A further object is to provide means, such as described above, whereby the wheels may be raised from the ground, and subsequently lowered again, operations being under the control of the driver while at his seat.

A further object is a provision of means for releasing the weight of the car on the springs, thus allowing them to be easily lubricated, and affording an opportunity to inspect and lubricate the shackle bolts and other related parts Other objects will appear from time to time in the course of the specifications.

Figure 1 is a side elevation of a vehicle with the invention applied, showing the lifting elements in inoperative position.

Figure 2 is a side elevation on an enlarged scale with parts broken away showing one of the lifting elements lowered to operative position;

Figure 3 is a side elevation showing the beginning of the lifting operation;

Figure 4 is a side elevation showing the completed lifting operation;

Figure 5 is a plan view illustrating the manual control and its connection with the lifting elements.

Figure 6 is a section on the lines 6—6 of Figure 3;

Figure 7 is a section on the lines 7—7 of Figure 6;

Figure 8 is a section on the lines 8—8 of Figure 7;

Figure 9 is a detailed view on an enlarged scale of the manual control shown in Figure 5;

Figure 10 is a detailed view on an enlarged scale of the means for controlling the operation of the rear lifting member;

Like letters and numbers represent like parts in all the figures.

A is a vehicle illustrated as the usual type of automobile with the front wheels $A'$, the rear wheels $A^2$ and the side frame members $A^3$ $A^3$. Pivoted at $A^4$ $A^4$ on the forward ends of the automobile frame members $A^3$ $A^3$ are the forward lifting members B B, each of which has a rounded upper end $B'$ extending above the pivot $A^4$, and terminates at its lower end in a fork $B^2$. The forks $B^2$ $B^2$ are perforated as at $B^3$ to receive a bar $B^4$ penetrating both sides of each of the forks. Keyed to the bar and lying within said forks are the discs $B^5$ $B^5$ eccentrically mounted on and keyed to said bar. The discs $B^5$ $B^5$ might be plane surfaced, but are preferably surfaced in such a manner as to make a gripping contact with the floor or road. They might be grooved, indented, mounted with studs or sharp points, or otherwise provided with frictional or ground gripping members. On the inside of the members B are the guiding eyes $B^6$. Penetrating them, and adapted to slide therein, are the bars or latches $B^7$ $B^7$ having on them the stops $B^8$ $B^9$ to limit the extension of said bars through said guiding eyes. At the upper end of each bar $B^7$ is a roller $B^{10}$. The lower end of each latch $B^7$ normally penetrates an aperture $B^{11}$ in the bar $B^4$ and is normally held therein by the pressure of a coiled spring $B^{12}$ exerted against the middle guiding eye $B^6$ and the lower stop $B^8$ on said latch. Mounted on the frame members $A^3$ $A^3$ adjacent the pivots $A^4$ $A^4$ are the stops C C which limit the rotation of the lifting members B B about said pivots, preventing them from reaching a fully perpendicular position. At the lower end of each stop is an inclined surface $C'$ adapted to engage the rollers $B^{10}$ $B^{10}$ at the upper end of the latches $B^7$ $B^7$. Coiled about each end of the bar $B^4$ is a spiral spring $C^2$ one end of which is attached to the bar at $C^3$ and the other end to the fork $B^2$ at $C^4$. It will be understood that the form of bar and spring illustrated, as in Figure 6 is to be taken as in a sense diagrammatical. Obviously, many forms of springs might be used in the place of the spiral spring $C^2$, and the bar $B^4$ may be eliminated, the members B B thus being separated, and springs $C^2$ $C^2$ being secured to stubs or other members on the forks $B^2$ $B^2$. This may be necessary, to permit the members B B to be lifted to a greater height where the power plant or other elements of the automobile will not permit sufficient clearance.

Pivoted at D—D at the rear of the automobile frame $A^3$ are the rear lifting members D' D', which may be shaped at their contacting end to prevent slipping by being pointed or provided with some other ground gripping element, each comprising a short segment $D^2$ above the pivot D and a long lower segment below the pivot D. Mounted on the frame $A^3$, adjacent the pivot D is the stop $D^3$ adapted to limit the rotation of the member D' about the pivot D before it reaches perpendicular. Mounted on the frame member $A^3$ is a latch $D^4$ adapted, when the member D' has swung to the position shown in Figure 4, to lock it in that position against the stop $D^3$.

The lifting members are normally, during motion of the automobile, held in the horizontal position, shown in Figure 1, being secured by cables E E, E' E'. The wires E E connect at $E^2$ $E^2$ to the forward lifting elements B B, and run thence over pulleys $E^3$ $E^3$ and $E^4$ $E^4$ and between the pair of pulleys $E^5$ $E^5$, and thence through an aperture in the dash board to the manual control member $E^6$ which is illustrated with a handle $E^7$. This handle is normally hooked over a holding hook $E^8$. The cables E' E' are connected to the members D' D' at $E^{10}$ $E^{10}$ and run over the adjacent pulleys $E^9$ $E^9$ and thence longitudinally along the frame members $A^3$ $A^3$ to the pulleys $E^3$ $E^3$, adjacent to which they are secured to the cables E E. Intermediate the pulleys $E^9$ and $E^3$ the cables E' E' have mounted thereon stops F F adapted to engage latch members F' F' on the levers $F^2$ $F^2$ pivoted to $A^3$ $A^3$ at $F^3$ $F^3$.

The opposite arm $F^4$ of the lever engages a depending latch $F^5$ on the lever $F^6$ pivoted to $A^3$ at $F^7$ which terminates in a cam surface $F^8$, which engages the top of the lifting member B' when said member is rotated into position against the stop C.

The latch $D^4$ is controlled by cables G G which are secured at $G^2$ $G^2$ to the outer ends of the latch levers G' G'. Springs $G^3$ $G^3$ connect the levers G' G' and the frame $A^3$ and normally keep the latch $D^4$ in operative position as shown in Figure 5. The cables G G passing about the pulleys $G^4$ $G^4$ converge on the bell crank lever $G^5$, the upper arm $G^6$ of which is actuated by a button $G^7$ placed beneath the foot of the operator, and normally raised from contact with $G^6$ by the spiral spring $G^8$.

The operative parts illustrated and described may vary widely in detail and particularly in the application of this invention to the various sizes, types and makes of automobiles. The shape, position and proportion of parts, the type of catches and releases, and the means by which they are controlled by the operator must be varied to suit the particular problem. The drawings and description will therefore be taken as diagrammatic and it will be understood that wide variations may be made in the details of practical application without departing from the spirit of my invention.

The use and operation of the invention are as follows:

When it is desired to lift the wheels of the automobile from the ground, the manual control $E^7$ is removed from its holding hook $E^8$, the wires E E are relaxed and the member B is lowered to the ground in the position shown in Figure 2. The car is then backed, and since the rear wheels are still on the ground the motive power is sufficient to back the car and lift the forward end on the members B B which are thus rotated about the pivots $A^4$ $A^4$ until they engage the stops C C. In the course of this rotation the upper ends B' B' of the members B B engage the cam surfaces $F^8$ $F^8$ on the levers $F^6$ $F^6$ and rotate said levers, thus springing the catches $F^5$ $F^5$ and releasing the lever arms $F^4$ $F^4$ which control the latches F' F'. The stops F F on the cables E' E' are thereby released, and those cables relaxed, thus lowering the rear lifting members D' D' to the position shown in Figure 4.

Immediately after the release of D' D', the cam surfaces C' C' on the stops C C engage the cam rollers $B^{10}$ $B^{10}$ and lift the latches $B^7$ $B^7$, thus permitting rotation of the bar $B^4$, and the discs $B^5$ $B^5$ eccentrically mounted thereon and keyed thereto.

The eccentric discs, before the release of this catch are so positioned that their pivot point is substantially as shown in Figure 3 and they are in an extended position in relation to the members B B. When the catch is sprung the eccentric discs immediately rotate in the direction of the arrow in Figure 3, to take the position shown in Figure 4. This rearward rotation, which is forced by the pressure on the eccentric discs of the heavy front end of the car, and the motor, forces the car to continue the rearward motion already begun under its own power. This rearward motion caused by the rotation of the eccentric discs, and the existing momentum caused by the rearward motion of the machine under its own power is sufficient to lift the rear of the machine upon the rear lifting member D' which is rotated about its center D until it engages the stop $D^3$ and is secured in that position by the latch D⁴. The rotation of the eccentric disc has substantially lowered the front wheels but has also raised the rear wheels and the car is in the position shown in Figure 4.

When it is wished to release the car from its raised position, the operator presses the button G⁷ and thus through the lever G⁶ and the cables G G withdraws the latches D⁴ D⁴, and releases the rear lifting members D' D'. Since all the lifting members, when the car is in a raised position, incline forward as illustrated in Figure 4, the release of the latches D⁴ D⁴ permits the car to swing forward off of the lifting members. The operator then pulls up on the manual member E⁷ and hooks it over the holding hood E⁸, thereby pulling all the lifting members into the position shown in Figure 1, and securing the stop F by the latch F'. When the members B B are lifted from the ground the springs C² C² rotate the eccentric discs back to the position shown in Figure 7, and they are then secured in place by the spring operated latches B⁷ B⁷.

To summarize the action of the invention, the front of the automobile is lifted by the motive force of the machine to a relatively considerable height, and is then partially lowered or dropped. The power generated by this drop, coupled with the momentum already gained by the rearward operation of the machine raises the rear of the machine by rotating the whole machine about the upper end of the rear lifting member.

Locking the lifting members in a position short of perpendicular enables the machine to be lowered from the lifting position by merely withdrawing the catch which holds the rear lifting member in position. The entire operation may be performed by the chauffeur or driver without his leaving his seat.

The use of the invention is as follows:

It is highly important that heavy automobiles, loaded trucks and the like having pneumatic tires should not be left on their tires when not in use. It is customary particularly with heavy trucks, to jack the trucks up when not in use, and this is prevailingly done by the drivers by hand. This invention works a great saving of time and energy since the relatively long and annoying hand jacking is entirely obviated. The driver can raise the truck tires from the pavement without leaving his seat. The same factors exist with the lighter cars, and any private car owner may lengthen the life of his tires by taking the weight of the car off of them when it is in the garage. The invention also furnishes a substitute for the ordinary jack when it is desired to change tires or to perform any service to an automobile which requires the wheels to be raised from the ground, such as clearing the wheels for inspection and lubricating the springs.

I claim:

1. The process of lifting a vehicle from the ground, which consists in raising one end of the vehicle, and in subsequently raising the opposite end by the power developed by a partial lowering of the first end.

2. The process of lifting a vehicle from the ground which consists in raising one end of the vehicle by the automotive power of the vehicle, and subsequently raising the opposite end by the power developed by a partial lowering of the first end.

3. The process of lifting an automotive vehicle from the ground which consists in raising one end of the vehicle by the use of its automotive power and in subsequently raising the other end of the vehicle by pivoting the vehicle on a lifting member, and partially lowering the raised end.

4. The process of lifting an automotive vehicle from the ground which consists in raising one end of the vehicle by the use of its automotive power and in subsequently raising the opposite end of the vehicle by rotating the vehicle on a transversal support intermediate its ends.

5. A device for lifting an automotive vehicle from the ground which comprises a lifting member pivoted beneath one end of the vehicle, automotive means for lifting said vehicle upon said member, a second lifting member pivoted beneath the opposite end of the vehicle, means for lowering said lifting member to the ground, during the lifting of one end of the vehicle, and means for rotating said vehicle upon the other lifting element, comprising means for partially lowering the lifted end of the vehicle.

6. A device for lifting an automotive vehicle from the ground which comprises a lifting member pivoted beneath one end of the vehicle, and means for varying the length of said lifting member, a lifting member pivoted beneath the opposite end of the vehicle, automotive means for lifting the first mentioned end of said vehicle upon its lifting member, means for lifting the opposite end of said vehicle upon its lifting member by rotating the vehicle thereupon, comprising means for shortening the first mentioned lifting member.

7. A device for lifting an automotive vehicle from the ground which comprises a lifting member pivoted beneath one end of said vehicle, a disc eccentrically mounted at the lower end of said member and normally maintaining an extended position in relation to said member, means for lifting the one end of said vehicle upon said member and extended disc, a lifting member pivoted upon the opposite end of said vehicle and means for rotating said vehicle upon said second lifting member, comprising means for permitting the rotation of said eccentric member.

8. A device for lifting an automotive vehicle from the ground which comprises a lifting member pivoted beneath one end of said vehicle, a disc eccentrically mounted at the lower end of said member and normally maintaining an extended position in relation to said member, automotive means for lifting one end of said vehicle upon said member and extended disc, a lifting member pivoted beneath the opposite end of said vehicle, and means for lifting said vehicle upon said second member, comprising means for releasing the eccentrically mounted disc, and permitting it to rotate in the direction of the second lifting member.

9. The process of lifting an automotive vehicle from the ground which consists in raising one end of the vehicle by the use of the automotive power of the vehicle, and in subsequently raising the other end of the vehicle by pivoting the vehicle on a lifting member and partially lowering the first mentioned end and using the power thus obtained to move the whole vehicle in the direction of the second lifting member, and up upon it.

10. The process of lifting a wheel of an automotive vehicle from the ground by raising a wheel on one axle by the automotive power of the vehicle, and subsequently raising a wheel on the other axle by pivoting the vehicle on a lifting member and partially lowering the raised wheel and axle.

11. A device for raising a wheel of an automotive vehicle from the ground, which comprises a lifting member pivoted beneath one axle of the vehicle and means for varying the length of said lifting member, a lifting member pivoted beneath the opposite axle of the vehicle, automotive means for lifting a wheel on one axle upon the adjacent lifting member, and means for lifting a wheel upon the other axle of said vehicle upon its lifting member by shortening the first mentioned lifting member.

12. A device for lifting an automotive vehicle from the ground which comprises a lifting member secured beneath one end of the vehicle, automotive means for lifting said vehicle upon said member, a second lifting member secured beneath the opposite end of the vehicle, means for lowering said lifting member to the ground, during the lifting of one end of the vehicle, and means for rotating said vehicle upon the other lifting element, comprising means for partially lowering the lifted end of the vehicle.

Signed at Chicago, county of Cook and State of Illinois, this 17th day of January, 1921.

JOHN F. GOODRICH.